(12) United States Patent
Essaki et al.

(10) Patent No.: US 9,318,737 B2
(45) Date of Patent: Apr. 19, 2016

(54) NEGATIVE ELECTRODE MATERIAL FOR NON-AQUEOUS ELECTROLYTE SECONDARY BATTERY, NEGATIVE ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicant: KABUSHIKI KAISHA TOSHIBA, Minato-ku, Tokyo (JP)

(72) Inventors: Kenji Essaki, Kanagawa (JP); Takayuki Fukasawa, Kanagawa (JP); Tomokazu Morita, Chiba (JP); Noikazu Osada, Tokyo (JP); Yasuyuki Hotta, Tokyo (JP); Takashi Kuboki, Tokyo (JP); Toshiro Hiraoka, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 18 days.

(21) Appl. No.: 13/774,169

(22) Filed: Feb. 22, 2013

(65) Prior Publication Data

US 2013/0337314 A1    Dec. 19, 2013

(30) Foreign Application Priority Data

Jun. 18, 2012 (JP) ................................. 2012-136752

(51) Int. Cl.
| | | |
|---|---|---|
| H01M 4/58 | (2010.01) | |
| H01M 4/134 | (2010.01) | |
| H01M 4/133 | (2010.01) | |
| H01M 4/36 | (2006.01) | |
| H01M 4/62 | (2006.01) | |
| H01M 4/04 | (2006.01) | |
| H01M 4/02 | (2006.01) | |

(52) U.S. Cl.
CPC .............. *H01M 4/134* (2013.01); *H01M 4/133* (2013.01); *H01M 4/366* (2013.01); *H01M 4/625* (2013.01); *H01M 4/0471* (2013.01); *H01M 2004/021* (2013.01); *Y02E 60/122* (2013.01)

(58) Field of Classification Search
CPC ..... H01M 4/134; H01M 4/133; H01M 4/386; H01M 4/48; H01M 4/362; H01M 4/583; H01M 4/366; H01M 4/625; H01M 4/0471; H01M 10/052; H01M 2004/021; Y02E 60/122
See application file for complete search history.

(56) References Cited

U.S. PATENT DOCUMENTS

| | | | |
|---|---|---|---|
| 7,303,838 B2 | 12/2007 | Morita et al. | |
| 2006/0068287 A1 | 3/2006 | Morita et al. | |
| 2008/0145757 A1* | 6/2008 | Mah et al. ...................... | 429/219 |
| 2008/0261112 A1 | 10/2008 | Nagata et al. | |
| 2009/0162750 A1 | 6/2009 | Kawakami et al. | |
| 2012/0077087 A1 | 3/2012 | Cho et al. | |
| 2012/0321949 A1* | 12/2012 | Kawakami et al. ........... | 429/211 |
| 2014/0199579 A1 | 7/2014 | Morita et al. | |

FOREIGN PATENT DOCUMENTS

| | | | | |
|---|---|---|---|---|
| CN | 101849306 A | 9/2010 | | |
| JP | 2002-170561 A | 6/2002 | | |
| JP | 2008-269827 A | 11/2008 | | |
| JP | 2009-164104 A | 7/2009 | | |
| JP | 2009-301937 | 12/2009 | | |
| JP | 2010-232077 | * 10/2010 | .............. | H01M 4/62 |
| JP | 2010-267588 | 11/2010 | | |
| JP | 2011-60676 A | 3/2011 | | |
| JP | 2011-079724 | 4/2011 | | |
| WO | 2010120011 A1 | 10/2010 | | |
| WO | PCT/JP2012/057460 | 3/2012 | | |
| WO | PCT/JP2012/057831 | 3/2012 | | |
| WO | 2013145108 A1 | 3/2013 | | |
| WO | 2013140595 A1 | 9/2013 | | |

OTHER PUBLICATIONS

Japanese Office Action dated Aug. 26, 2014 from corresponding JP Application No. 2012-136752, 4 pages.
Japanese Office Action dated Apr. 21, 2015 with English translation from corresponding JP Application No. 2012-136752.
Chinese Office Action dated Mar. 16, 2015 with English translation from corresponding Chinese Application No. 201310056303.0.
Japanese Preappeal Reconsideration Report dated Sep. 14, 2015 from corresponding Japanese Patent Application No. 2012-136752, 4 pages.
Chinese Second Office Action dated Dec. 4, 2015 from corresponding Chinese Patent Application No. 201310056303.0, 6 pages.

* cited by examiner

*Primary Examiner* — Raymond Alejandro
(74) *Attorney, Agent, or Firm* — Ohlandt, Greeley, Ruggiero & Perle, L.L.P.

(57) ABSTRACT

There is provided a negative electrode material for non-aqueous electrolyte secondary batteries, the negative electrode material being a silicon oxide represented by the composition formula, $SiO_x$, containing silicon and silicon oxide, in which x satisfies the relation of $0.1 \leq x \leq 0.8$; the silicon oxide contains crystalline silicon; among the particles of crystalline silicon having a diameter of 1 nm or greater, the proportion by number of particles having a diameter of 100 nm or less is 90% or greater; and the BET specific surface area of the silicon oxide is larger than 100 $m^2/g$.

9 Claims, 9 Drawing Sheets

NEGATIVE ELECTRODE MATERIAL FOR NON-AQUEOUS ELECTROLYTE SECONDARY BATTERY, NEGATIVE ELECTRODE ACTIVE MATERIAL FOR NON-AQUEOUS ELECTROLYTE SECONDARY BATTERY, AND NON-AQUEOUS ELECTROLYTE SECONDARY BATTERY

CROSS-REFERENCE TO RELATED APPLICATION

This application is based upon and claims the benefit of priority from Japanese Patent Applications No. 2012-136752, filed on Jun. 18, 2012; the entire contents of which are incorporated herein by reference.

FIELD

Embodiments described herein relate generally to a negative electrode material for non-aqueous electrolyte secondary battery, a negative electrode active material for non-aqueous electrolyte secondary battery, and a non-aqueous electrolyte secondary battery.

BACKGROUND

In recent years, rapid development of the technologies for miniaturization of electronics equipment has brought about popularization of various portable electronic instruments. There is also a demand for miniaturization of batteries that are used as electric power sources for these portable electronic instruments, and thus, non-aqueous electrolyte secondary batteries having high energy densities have attracted public attention.

Particularly, there have been attempts to use elements that form alloys with lithium, such as silicon and tin, and substances which have a high lithium occlusion capacity and a high density, such as amorphous chalcogen compounds. Among them, silicon is capable of occluding lithium up to a ratio of 4.4 lithium atoms per one silicon atom, and the negative electrode capacity of silicon per unit mass is about 10 times the negative electrode capacity of graphitic carbon. However, silicon undergoes a large volume change when subjected to lithium insertion and extraction in charge-discharge cycles, and has a problem with the cycle life such as fine size reduction of active material particles.

The inventors of the present disclosure zealously repeated experiments, and as a result, they found that an active material produced by compositizing finely pulverized silicon monoxide and a carbonaceous material and calcining the composite, in which microcrystalline silicon is dispersed in the carbonaceous material in a state of being included or retained in silicon oxide that strongly binds to silicon, may be obtained, and thereby an increase in the capacity and an enhancement of cycle characteristics can be achieved. However, even in the case of an active material such as this, if the active material is subjected to several hundred charge-discharge cycles, the capacity is decreased, and the service life characteristics are not satisfactory for long-term use.

Furthermore, the inventors of the present disclosure conducted a thorough investigation on the cause of the decrease in the charge-discharge efficiency, and they found that the silicon oxide contained in the active material irreversibly reacts with lithium, and this is a main cause of a decrease in the charge-discharge efficiency in the first charge-discharge cycle. However, when silicon monoxide is used as a raw material as discussed above, the raw material is now $SiO_x$ (x=1), and there is a problem that the ratio of silicon and silicon oxide cannot be changed significantly.

DETAILED DESCRIPTION

There is provided a negative electrode material for non-aqueous electrolyte secondary batteries of an embodiment, the negative electrode material being a silicon oxide represented by the composition formula, $SiO_x$, containing silicon and silicon oxide, in which x satisfies the relation of $0.1 \leq x \leq 0.8$; the silicon oxide contains crystalline silicon; among the particles of crystalline silicon having a diameter of 1 nm or greater, the proportion by number of particles having a diameter of 100 nm or less is 90% or greater; and the BET specific surface area of the silicon oxide is larger than 100 $m^2/g$.

Embodiments will be described below with reference to the drawings.

Figure 1:
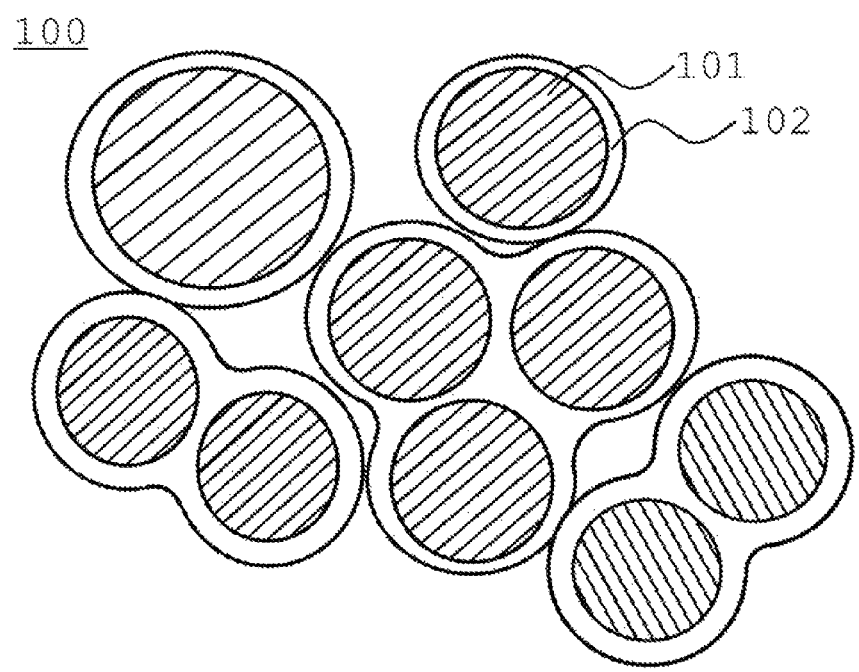
FIG. 1 is a conceptual diagram of an exemplary embodiment of the negative electrode material according to the present disclosure.

The negative electrode material of an exemplary embodiment contains silicon, which is capable of insertion and extraction of lithium (Li) that is used in the negative electrode active material of a non-aqueous electrolyte secondary battery. As illustrated in the conceptual diagram of FIG. 1, the negative electrode material 100 of a first exemplary embodiment is composed of crystalline silicon 101 and silicon oxide 102 that covers the crystalline silicon 101, and the negative electrode material 100 is represented by the composition formula, $SiO_x$.

Crystalline silicon 101 of the negative electrode material 100 is covered with silicon oxide 102. Thereby, the growth of the grains of silicon 101 is prevented, and there is an advantage that the cycle characteristics of silicon are improved. Occasionally, silicon 101 in the form in which a portion of the silicon 101 is not covered with silicon oxide 102, may be included in the negative electrode material 100 at a proportion by number of 10% or less.

If x in the composition formula $SiO_x$ is small, the proportion of silicon 101 that implements insertion and extraction of Li in the negative electrode material 100 is increased. From the viewpoint that when a negative electrode material with a high proportion of silicon is used in a non-electrolyte secondary battery, the charge-discharge capacity of the non-electrolyte secondary battery increases, it is preferable that $x \leq 0.8$. For the same reason, it is more preferable that $x \leq 0.7$, and it is even more preferable that $x \leq 0.5$. If x is too small, the amount of the silicon oxide 102 that covers silicon 101 is insufficient, and on the occasion of cycle use, problems such as fine size reduction of the negative electrode active material are likely to occur. Therefore, it is preferable that $x \leq 0.1$. Meanwhile, the ratio of oxygen/silicon in the negative electrode material can be calculated by determining the amount of silicon by an acid decomposition-inductively coupled plasma (ICP) emission spectroscopy method, and determining the amount of oxygen by an inert gas fusion-infrared absorption method.

In regard to the negative electrode material 100 of the exemplary embodiment, a powder of the silicon oxide forms secondary particles in which primary particles containing the crystalline silicon are aggregated, or a porous material containing the crystalline silicon, or even forms a mixture of the secondary particles and the porous material. The diameter of the primary particles is larger than the diameter of the silicon 101, and is preferably larger than 1 nm and equal to or less than 120 nm. Particularly, it is desirable that among the primary particles having a diameter of 1 nm or greater, the proportion by number of particles having a diameter of 100 nm or less be 90% or greater. Since the negative electrode material 100 is constituted of fine particles, it is advantageous that insertion and extraction of Li (lithium) easily occurs, and the full charge capacity is increased. Particles that do not satisfy the conditions of the particle size in the range described above may be included to an extent that the battery characteristics are not adversely affected, for example, in an amount of 30% or less. The size of the secondary particles of the negative electrode material 100 is appropriately adjusted by a mixing process, a pulverization process or the like, and the particle size is not particularly defined herein. Meanwhile, the diameter of the primary particles of the negative electrode material 100 is obtained by observing the negative electrode material 100 by scanning electron microscope (SEM), measuring the diameter of each of 10 or more primary particles randomly selected, and calculating the average value of the directional diameters of the ten randomly selected particles.

In regard to the negative electrode material 100 of the exemplary embodiment, the porous material preferably contains fine pores having a pore size of 120 nm or less. Particularly, it is desirable that the proportion of such fine pores among those fine pores having a pore size of 500 nm or less be 60% or greater. Furthermore, the secondary particles also have a porous structure. Also in this case, it is desirable that the proportion of fine pores having a pore size of 120 nm or less among those fine pores having a pore size of 500 nm or less be 60% or greater. The distribution of these fine pores can be measured by the Brunauer-Emmett-Teller (BET) method. It is preferable to mitigate the expansion and contraction of the silicon 101 resulting from the insertion and extraction of Li, by means of the porous structure of the negative electrode material 100. When the specific surface area is increased in a negative electrode material having a particle size in the order of micrometers, the proportion of silicon in the negative electrode material 100 is likely to decrease, and there is a problem of capacity reduction. On the other hand, since the silicon 101 of the exemplary embodiment has a particle size in the order of nanometers, even if the specific surface area is increased, a high proportion of the silicon 101 in the negative electrode material 100 can be maintained. If the specific surface area according to the BET method is 100 $m^2/g$ or less, the effect described above is decreased, which is not preferable. Therefore, the specific surface area according to the BET method of the negative electrode material 100 of the exemplary embodiment is preferably larger than 100 $m^2/g$. For the same reason, the specific surface area is more preferably 150 $m^2/g$ or greater. An upper limit of the specific surface area is preferably 1500 $m^2/g$ or less, more preferably 1000 $m^2/g$ or less, and even more preferably 300 $m^2/g$ or less.

The silicon 101 is in the form of particles containing at least a crystalline portion. The diameter of the silicon 101 is preferably from 1 nm to 100 nm. If the diameter of the silicon 101 is smaller than 1 nm, it is not preferable because the particles of the silicon 101 aggregate with each other upon cycle use, and grain growth is likely to occur. Furthermore, if the diameter of the silicon 101 is larger than 100 nm, it is not preferable because it is difficult to achieve insertion and extraction of lithium. The diameter of the silicon 101 is obtained by observing the negative electrode material by transmission electron microscope (TEM), measuring the diameter of each of 10 or more crystalline regions that are randomly selected from an image obtained by TEM, and calculating the average value of the directional diameters of the randomly selected 10 crystalline regions. The crystalline region can be discriminated on the basis of, for example, an area where crystal lattices are observed in the TEM image. However, crystalline materials in which the aspect ratio (=[maximum value of the diameter]/[minimum value of the diameter]) is 3 or greater, are excluded from the calculation of the diameter of the silicon 101. Meanwhile, particles of the silicon 101 having a diameter of larger than 100 nm may be included in the particles of the silicon 101 having a diameter of 1 nm or greater at a proportion by number of 10% or less, to the extent that the battery characteristics are not affected.

Figure 2:
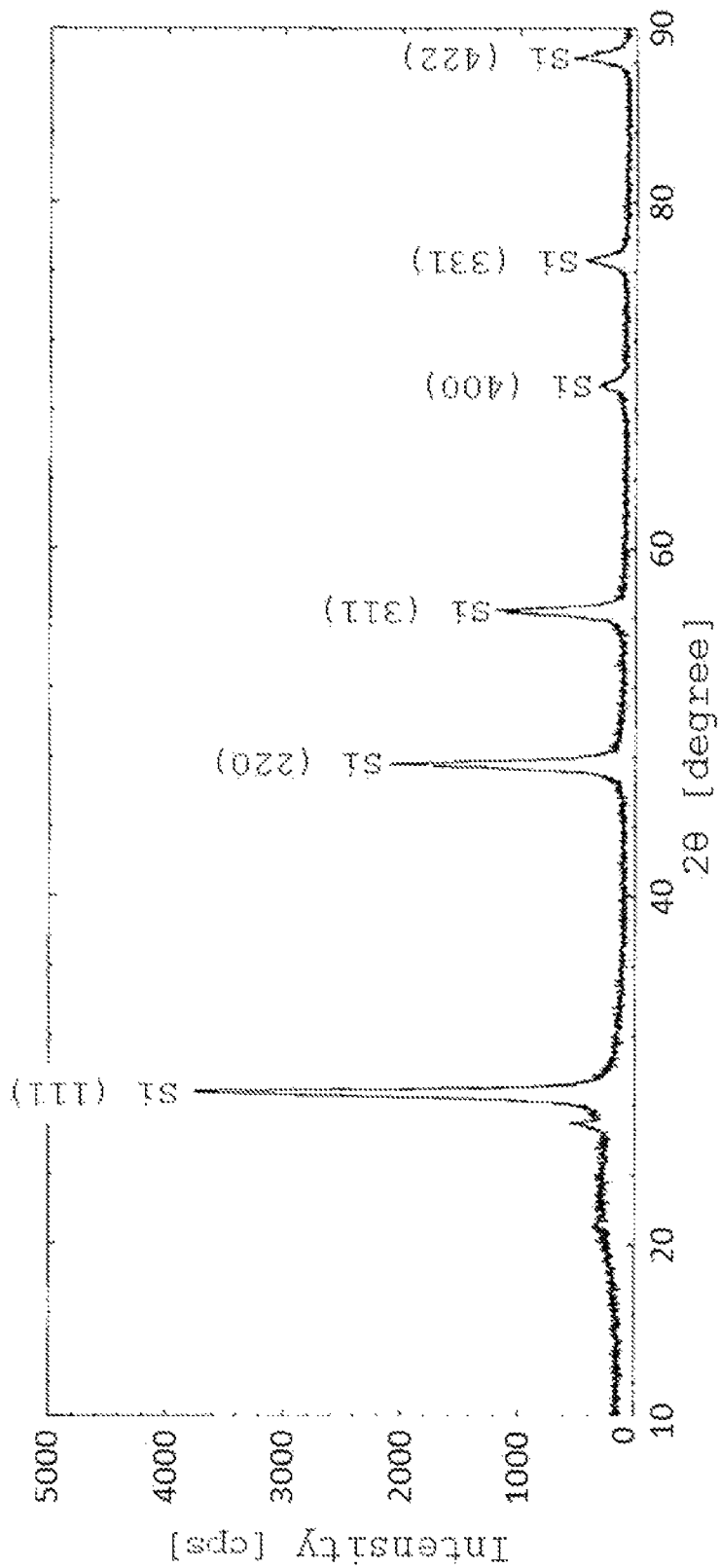
FIG. 2 is a spectrum of an exemplary embodiment of the negative electrode material according to the present disclosure.

Crystallinity of the silicon 101 can be evaluated by an X-ray diffraction analysis. The diffraction peaks of the crystalline silicon of the exemplary embodiment illustrated in the spectrum of FIG. 2 coincide with the diffraction peaks of JCPDS (Joint Committee for Powder Diffraction Standards) Card No. 27-1402, which is a typical example. Meanwhile, in amorphous silicon, the peaks of Si(111), Si(220), Si(311), Si(400), Si(331) and Si(422) of FIG. 2 are not observed.

The periphery of the silicon 101 is surrounded by amorphous silicon oxide 102. Being amorphous can be discriminated on the basis of, for example, the fact that crystal lattices are not observed in the TEM image. Silicon oxide 102 covers one or more particles of the silicon 101. The silicon oxide 102 may also be in the form of covering so as to expose a portion of the particles of the silicon 101, in addition to the form of covering the entirety of the silicon 101. The thickness of the silicon oxide 102 that covers the silicon 101 is, for example, from 1 nm to 20 nm.

In the negative electrode material 100, a fibrous material containing silicon or silicon oxide may be included in the secondary particles. The fibrous material has a thickness of, for example, from 5 nm to 30 nm, and a length of 100 nm or greater. Since the diameter of the fibrous material is close to the diameter of the primary particles, it is preferable for the fibrous material to maintain the porous structure of the secondary particles and to contribute to further porosification. From the viewpoint of maintaining a porous structure, it is preferable that the length of the fibrous material be longer than the diameter of the primary particles.

Furthermore, it is also acceptable that lithium silicate such as $Li_4SiO_4$ is dispersed at the surface or in the interior of the silicon oxide 102. It is contemplated that a lithium salt that has been incorporated into the negative electrode material 100 undergoes, when subjected to a heat treatment, a solid reaction with the silicon oxide 102 and forms lithium silicate.

Figure 3:
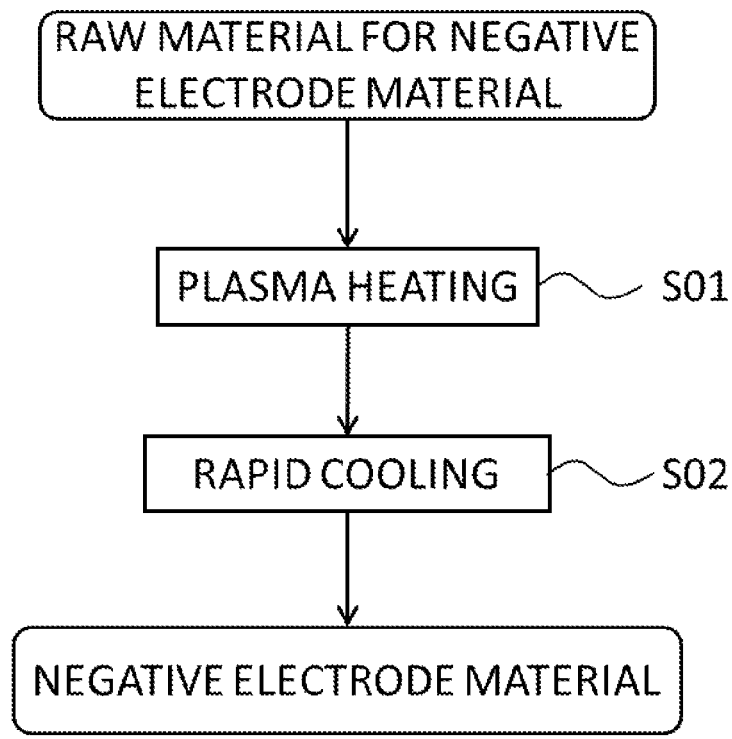
FIG. 3 is a chart diagram of an exemplary embodiment of a method for producing the negative electrode material according to the present disclosure.

Next, a method for producing the negative electrode material 100 will be described. As illustrated in the chart diagram of FIG. 3, the negative electrode material 100 is produced by using a mixed powder of silicon and silicon oxide as a raw material, rapidly heating (S01) this mixed powder, and rapidly cooling (S02) the mixed powder. As a typical method for carrying out this rapid heating and rapid cooling, plasma heating may be used. In the plasma heating method, it is preferable to provide a region at a temperature of from 5,000° C. to 10,000° C. inside the apparatus, and to allow the raw material powder or a vaporization product thereof to pass through the aforementioned region. This is because, although the boiling point of silicon and the boiling point of silicon dioxide, which is a representative silicon oxide, are lower than 2,000° C., it is preferable to allow the mixed powder to pass through a region at a temperature much higher than the boiling points, in order to accelerate the rate of heat transfer to the interior of the raw material powder and to thereby complete vaporization in a short time. Furthermore, the raw material powder that is fed to plasma heating, and a product obtained therefrom have different atomic molar ratios of silicon and oxygen. Particularly, in the case of subjecting a mixed powder containing silicon and silicon dioxide to plasma heating, a portion of silicon tends to be oxidized until the product is collected. Therefore, it is preferable to have the ratio of silicon/oxygen in the raw material powder set high.

Second Exemplary Embodiment

Figure 4:
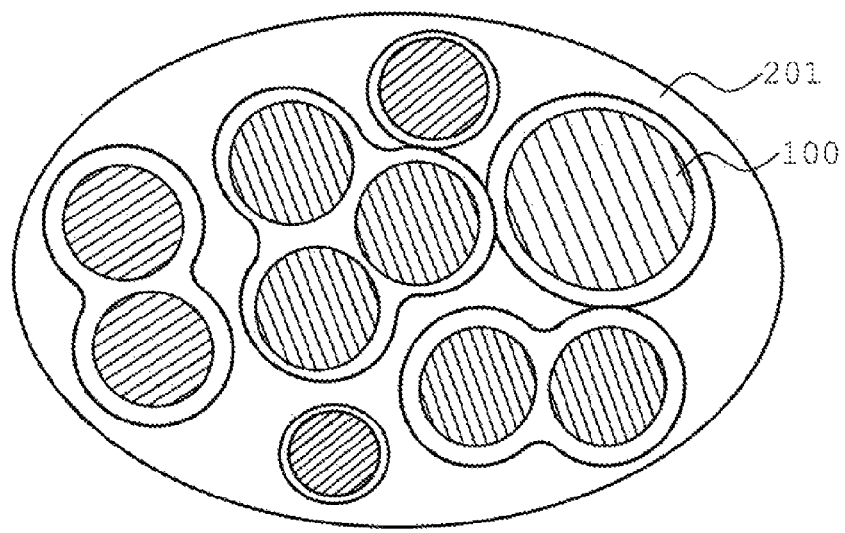
FIG. 4 is a conceptual diagram of an exemplary embodiment of the negative electrode active material according to the present disclosure.

As illustrated in the conceptual diagram of FIG. 4, a negative electrode active material 200 of the second exemplary embodiment contains a carbonaceous material 201 and the negative electrode material 100 in the carbonaceous material 201. The negative electrode material 100 is dispersed in the carbonaceous material 201.

The negative electrode active material 200 is constituted of particles containing the negative electrode material 100 that has been explained in the first exemplary embodiment and is capable of insertion and extraction of Li. The average primary particle size of the negative electrode active material 200 is preferably from 1 μm to 80 μm. The average primary particle size of the negative electrode active material 200 is more preferably from 10 μm to 60 μm. The particle size of an active material affects the rate of the insertion-extraction reaction of lithium, and exerts great influence on the negative electrode characteristics; however, if the particle size value is in this range, the active material can stably exhibit the characteristics. Meanwhile, the average primary particle size is determined by averaging the sizes of ten particles of the negative electrode active material randomly selected from a SEM image.

The carbonaceous material 201 of the exemplary embodiment is an electroconductive material, and is compositized with the negative electrode material 100. The carbonaceous material 201 constitutes the negative electrode active material. As the carbonaceous material 201, one or more kinds selected from the group including graphite, hard carbon, soft carbon, amorphous carbon, and acetylene black can be used. Among them, graphite only, or a mixture of graphite and hard carbon is preferred for the reason that follows. Graphite is preferred as the carbonaceous material 201 of the negative electrode active material 200 from the viewpoint of increasing the electrical conductivity of the active material. Hard carbon is preferred as the carbonaceous material 201 of the negative electrode active material 200 from the viewpoint of being significantly effective in covering the entirety of the active material and relaxing expansion and contraction. Meanwhile, the term compositization includes both the form in which the negative electrode material 100 is enclosed by the carbonaceous material 201, and the form in which the negative electrode material 100 and the carbonaceous material 201 are retained.

Meanwhile, the negative electrode active material 200 may be coated with a compound of the same type as the carbonaceous material 201 mentioned above. When the negative electrode active material 200 is coated, it is advantageous that since the negative electrode material 100 is not exposed and is covered with a carbon-based compound, the electrical conductivity of the negative electrode active material 200 is excellent.

Furthermore, in order to obtain satisfactory characteristics of the active material as a whole, it is preferable that the fluctuation of the size of the negative electrode material 100 be as small as possible. When the diameter of 16% cumulative volume fraction of the silicon oxide phase that is considered as particles is designated as d16%, and the diameter of 84% cumulative volume fraction is designated as d84%, with regard to the standard deviation represented by (d84%–d16%)/2, the value of (standard deviation/average size) is preferably 1.0 or less, and if the value is 0.5 or less, excellent service life characteristics can be obtained. Meanwhile, the average size (volume average), and the standard deviation defined by the formula (d84%–d16%)/2 are determined by a method such as described below. A SEM image of the cross-section of a negative electrode active material 200 that has been synthesized and calcined is taken. The image thus taken is analyzed with a SEM image analysis software (Mac-View, manufactured by Mount Technologies, Ltd.) while the negative electrode material 100 is considered as particles, and thus particle size distribution data are obtained. From the particle size distribution data thus obtained, the average size (volume average), the standard deviation defined by the formula, (d84%–d16%)/2, and the value of (standard deviation/average size) are calculated.

Furthermore, in order to prevent drastic change of the structure of the particles and aggregation of the negative electrode material 100, and to secure electrical conductivity, it is preferable that carbon fiber be included in the carbonaceous material 201. It is effective when the diameter of the carbon fiber that is added be of approximately the same size as the diameter of the particles of the negative electrode material 100, and the average diameter of the carbon fiber is preferably from 50 nm to 1000 nm, and particularly preferably from 100 nm to 500 nm. The content of the carbon fiber is preferably in the range of from 0.1% by mass to 8% by mass, and particularly preferably from 0.5% by mass to 5% by mass, relative to the mass of the negative electrode active material 200. Meanwhile, the average diameter of the carbon fiber is obtained by randomly selecting 10 strands of carbon fiber from a SEM image, and calculating the average value of the diameters.

The carbonaceous material 201 may also contain an alkoxide and a Li compound. When these substances are included, bonding of the silicon oxide 102 and the carbonaceous material 201 of the negative electrode material 100 becomes strong, and at the same time, $Li_4SiO_4$ having excellent Li ion conductibility is produced in the silicon oxide 102 of the negative electrode material 100. Examples of the alkoxide include silicon ethoxide. Examples of the Li compound include lithium carbonate, lithium oxide, lithium hydroxide, lithium oxalate, and lithium chloride.

Furthermore, in order to prevent drastic change of the structure of the particles and aggregation of the negative electrode material 100, it is preferable that the carbonaceous material 201 contain zirconia or stabilized zirconia. When the aggregation of the negative electrode material 100 is prevented, there is an advantage that the cycle characteristics are enhanced.

Furthermore, the full width at half maximum of the diffraction peak of Si (220) plane in the powder X-ray diffraction analysis of the active material is preferably from 1.0° to 8.0°. The full width at half maximum of the diffraction peak of the Si (220) plane decreases as the crystal grains of the Si phase grow. When the crystal grains of the Si phase grow large, the crystal grains are likely to produce cracks and the like in the active material particles, along with the expansion and contraction occurring as a result of the insertion and extraction of lithium; however, for this reason, when the full width at half maximum is in the range of from 1.0° to 8.0°, it can be avoided that such a problem is raised as an issue.

(Production Method)

Next, a method for producing the negative electrode active material 200 for non-aqueous secondary batteries according to the second exemplary embodiment will be described.

In the present exemplary embodiment, the negative electrode material 100, a resin which is an organic compound, one or more carbon materials selected from the group including graphite, cokes, low-temperature calcined carbon, and pitch, and optionally a zirconium compound are mixed, and the mixture is calcined at a temperature of from 1,000° C. to 1,400° C. Thus, a negative electrode active material 200 is obtained.

The negative electrode active material 200 related to the second exemplary embodiment can be synthesized by subjecting the raw materials to a mixing treatment through a mechanical treatment or a stirring treatment in the solid state or liquid state, and a calcination treatment.

(Compositization Treatment)

In the compositization treatment, the negative electrode material 100, an organic material, and a carbon material are added and mixed, and thereby a composite is formed.

The negative electrode material 100, the organic material, and the carbon material can be compositized by mixing and stirring in the liquid state. The mixing and stirring treatment can be carried out by means of, for example, various stirring apparatuses, a ball mill, a bead mill apparatus, and combinations thereof. The compositization of the negative electrode material 100, the organic material and the carbon material may be carried out by liquid-state mixing in a liquid using a dispersion medium. Meanwhile, in a dry mixing method, it is difficult to uniformly disperse a silicon oxide material, a carbon material and a zirconia compound without aggregating the materials.

Regarding the dispersion medium, an organic solvent, water or the like can be used, but it is preferable to use a liquid which has satisfactory affinity with both the negative electrode material 100, and carbon precursors and carbon materials. Specific examples thereof include ethanol, acetone, isopropyl alcohol, methyl ethyl ketone, and ethyl acetate.

As the organic material, an organic compound such as a monomer or an oligomer, which is liquid and easily polymerizable, is used. Examples thereof include a furan resin, a xylene resin, a ketone resin, an amino resin, a melamine resin, a urea resin, an aniline resin, a urethane resin, a polyimide resin, a polyester resin, a phenolic resin, and monomers thereof. Specific examples of the monomer include furan compounds such as furfuryl alcohol, furfural, and furfural derivatives, and the monomer is used after being polymerized in a mixture of the compositization materials. On the occasion of polymerization, hydrochloric acid or an acid anhydride may be added to the polymerization mixture, or the like.

Regarding the carbon material, one or more kinds selected from the group including graphite, cokes, low-temperature calcined carbon, pitch, and the like can be used. Particularly, since a material which melts by heating, such as pitch, melts during a mechanical mill treatment and prevents satisfactory progress of compositization, such a material may be used as a mixture with a material which does not melt, such as cokes or graphite.

(Calcination Treatment)

Carbonization calcination is carried out by performing heating in an inert atmosphere of Ar or the like. In the carbonization calcination process, a polymer or a carbon precursor such as pitch in the negative electrode material-organic material compositization product is carbonized. A preferred temperature of carbonization calcination is in the range of from 600° C. to 1,500° C., and more preferably from 800° C. to 1,300° C. As the temperature decreases, carbonization occurs insufficiently, and as the temperature increases, there is a higher possibility that the silicon phase in the negative electrode material for non-aqueous electrolyte batteries may cause grain growth. The calcination time is preferably between one hour and 12 hours.

(Carbon Coating Treatment)

Before the calcination treatment that is carried out after the compositization treatment, the particles which are constituted of the composite obtained by the compositization treatment may be subjected to carbon coating. Regarding the material to be used for the coating, a material which is converted to the carbonaceous material 201 when heated in an inert atmosphere, such as pitch, a resin or a polymer, can be used. Specifically, a material which is easily carbonized by calcination at about 1,200° C., such as petroleum pitch, mesophase pitch, a furan resin, cellulose, or a rubber compound, is preferred. This is because, as discussed in the section "Calcination treatment", calcination may not be carried out at a temperature higher than 1,400° C.

Regarding the coating method, a product obtained by polymerizing a monomer in a state in which composite particles are dispersed in the monomer, and solidifying the resultant, is subjected to calcination. Alternatively, a polymer is dissolved in a solvent, composite particles are dispersed therein, and then a solid obtained by evaporating the solvent is subjected to calcination. Furthermore, as another method to be used for carbon coating, carbon coating by chemical vapor deposition (CVD) may also be carried out. This method is a method of causing a gaseous carbon source to flow over a sample that has been heated to a temperature of from 800° C. to 1,000° C., with an inert gas being used as a carrier gas, and carbonizing the sample on the surface of the sample. In this case, benzene, toluene, styrene, or the like can be used as the carbon source.

At the time of this carbon coating treatment or compositization treatment, an alkoxide, a Li compound, or carbon fiber may also be added simultaneously.

The negative electrode active material 200 related to the present exemplary embodiment is obtained by a synthesis method as described above. The product obtained after carbonization calcination may be treated to adjust the particle size, specific surface area, and the like by using various mills, pulverization apparatuses, grinders, and the like.

Third Exemplary Embodiment

A non-aqueous electrolyte secondary battery related to a third exemplary embodiment will be described.

The non-aqueous electrolyte secondary battery according to the third exemplary embodiment includes a packaging material; a positive electrode accommodated inside the packaging material; a negative electrode which is accommodated inside the packaging material by being disposed spatially apart from the positive electrode with, for example, a separator interposed therebetween, and contains an active material; and a non-aqueous electrolyte filled inside the packaging material.

Figure 5:
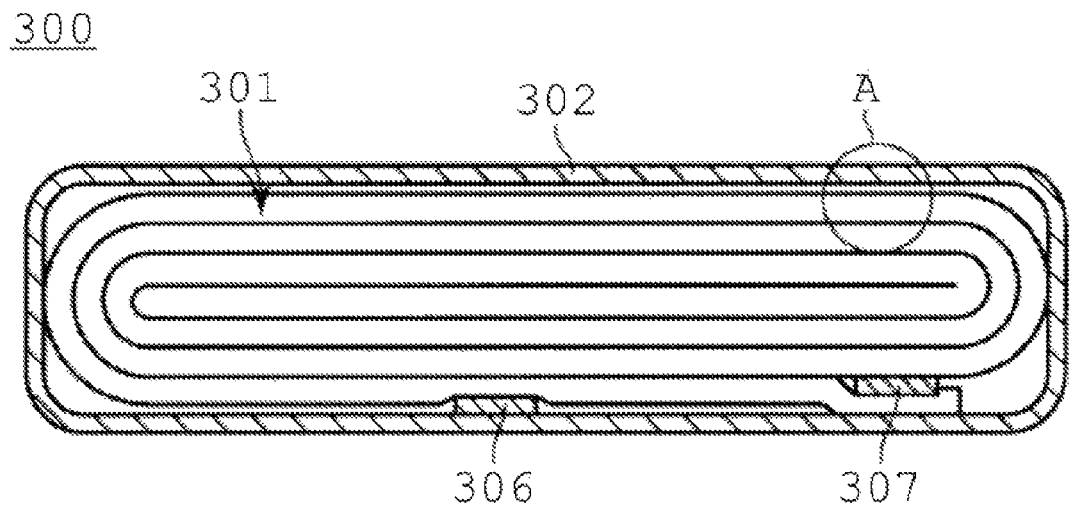
FIG. 5 is a conceptual diagram of an exemplary embodiment of the non-aqueous electrolyte secondary battery according to the present disclosure.
Figure 6:
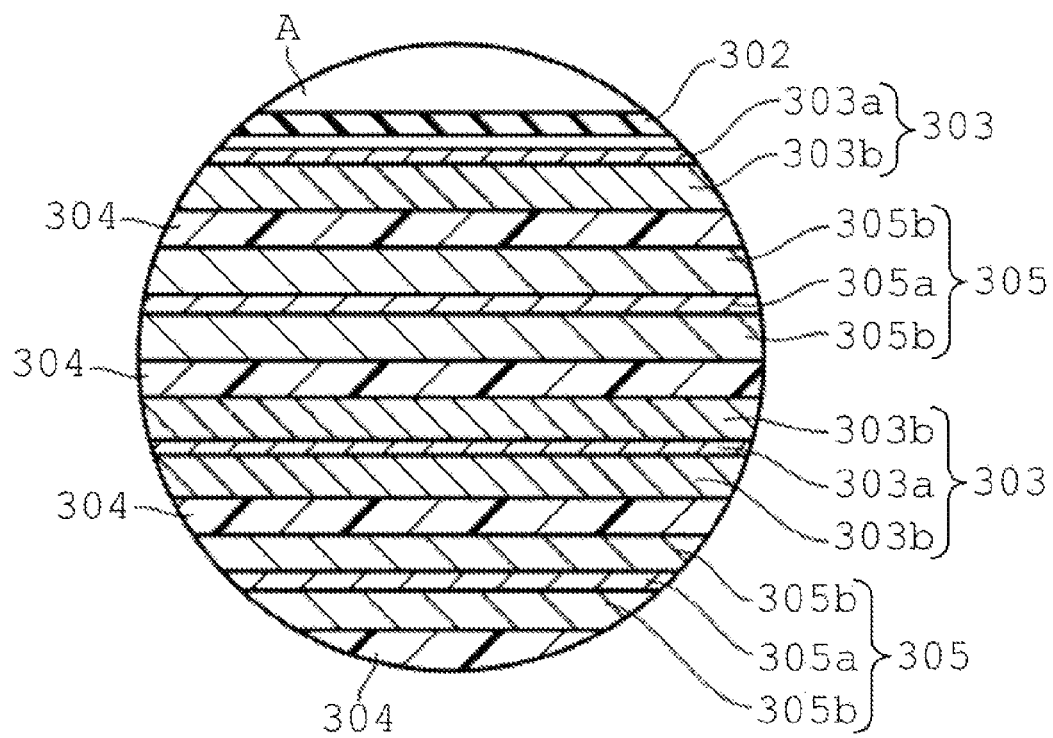
FIG. 6 is a magnified conceptual diagram of an exemplary embodiment of the non-aqueous electrolyte secondary battery according to the present disclosure.

An example of the non-aqueous electrolyte secondary battery 300 according to the exemplary embodiment will be described in detail with reference to the conceptual diagrams of FIG. 5 and FIG. 6. FIG. 5 is a conceptual diagram of the cross-section of a flat type non-aqueous electrolyte secondary battery 300 in which a pouch type packaging material 302 is formed from a laminate film, and FIG. 6 is a magnified cross-sectional diagram of area A of FIG. 5. Meanwhile, the respective diagrams are conceptual diagram only for illustrative purposes, and although the shape, dimension, ratio, and the like may be different from those of an actual apparatus, these items can be appropriately designed and modified with reference to the following explanation and known technologies.

A flat-shaped spiral electrode group 301 is accommodated in a pouch type packaging material 302 formed from a laminate film in which an aluminum foil is interposed between two sheets of resin layers. The flat-shaped spiral electrode group 301 is formed by winding a laminate obtained by laminating a negative electrode 303, a separator 304, a positive electrode 305, and a separator 304 in this order from the outer side, into a spiral form, and press-molding the wound laminate. The negative electrode 303 of the outermost shell has a configuration in which, as illustrated in FIG. 6, a negative electrode active material layer 303b is formed on one surface on the inner surface side of a negative electrode current collector 303a. The negative electrode 303 in other parts has a configuration in which a negative electrode active material layer 303b is formed on both surfaces of a negative electrode current collector 303a. The active material in the negative electrode active material layer 303b contains the active material for batteries 200 according to the second exemplary embodiment. The positive electrode 305 has a configuration in which a positive electrode active material layer 305b is formed on both surfaces of a positive electrode current collector 305a.

In the vicinity of the outer peripheral edge of the spiral electrode group 301, a negative electrode terminal 306 is electrically connected to the negative electrode current collector 303a of the negative electrode 303 in the outermost shell, and a positive electrode terminal 307 is electrically connected to the positive electrode current collector 305a of the positive electrode 305 on the inner side. These negative electrode terminal 306 and positive electrode terminal 307 are extended to the outside of the pouch type packaging material 302 through an opening. For example, a liquid non-aqueous electrolyte is injected through the opening of the pouch type packaging material 302. By disposing the opening of the pouch type packaging material 302 between the negative electrode terminal 306 and the positive electrode terminal 307 and heat sealing the opening, the spiral electrode group 301 and the liquid non-aqueous electrolyte are completely sealed.

The negative electrode terminal 306 may be formed of, for example, aluminum or an aluminum alloy containing elements such as magnesium (Mg), titanium (Ti), zinc (Zn), manganese (Mn), iron (Fe), copper (Cu), and silicon (Si). The negative electrode terminal 306 is preferably formed of the same material as that of the negative electrode current collector 303a, so as to reduce the contact resistance with the negative electrode current collector 303a.

For the positive electrode terminal 307, a material having electrical stability and electrical conductivity and having an electrochemical potential relative to a lithium ion metal in the range of 3 V to 4.25 V, can be used. Specific examples thereof include aluminum and aluminum alloys containing elements such as Mg, Ti, Zn, Mn, Fe, Cu and Si. The positive electrode terminal 307 is preferably formed of the same material as that of the positive electrode current collector 305a, so as to reduce the contact resistance with the positive electrode current collector 305a.

Hereinafter, the pouch type packaging material 302, the positive electrode 305, the negative electrode 303, the electrolyte, and the separator 304, which are constituent members of the non-aqueous electrolyte secondary battery 300, will be described in detail.

1) Pouch Type Packaging Material 302

The pouch type packaging material 302 is formed from a laminate film having a thickness of 0.5 mm or less. Alternatively, a container made of a metal having a thickness of 1.0 mm or less is used as the external packaging. It is more preferable that the container made of a metal have a thickness of 0.5 mm or less.

The shape of the pouch type packaging material 302 can be selected from a flat shape (thin type), a rectangular shape, a cylindrical shape, a coin shape, and a button shape. Examples of the packaging material include, depending on the battery dimension, packaging materials for small-sized batteries that are loaded in, for example, portable electronic instruments, and packaging materials for large-sized batteries that are loaded in two-wheeled to four-wheeled vehicles and the like.

Regarding the laminate film, a multilayer film having a metal layer interposed between resin layers is used. The metal layer is preferably an aluminum foil or an aluminum alloy foil, in view of weight reduction. For the resin layer, for example, polymer materials such as polypropylene (PP), polyethylene (PE), nylon, and polyethylene terephthalate (PET) can be used. The laminate film can be formed into the shape of the packaging material by sealing by means of heat sealing.

The container made of a metal is formed of aluminum, an aluminum alloy, or the like. The aluminum alloy is preferably an alloy containing elements such as magnesium, zinc, and silicon. When transition metals such as iron, copper, nickel and chromium are contained in the alloy, the amount of the transition metals is preferably adjusted to 100 ppm by mass or less.

2) Positive Electrode 305

The positive electrode 305 has a structure in which the positive electrode active material layer 305b containing an active material is supported on one surface or on both surfaces of the positive electrode current collector 305a.

It is preferable that the thickness of one surface of the positive electrode active material layer 305b be in the range of 1.0 μm to 150 μm, from the viewpoint of maintaining the large current discharge characteristics of batteries and the cycle life. Therefore, when the positive electrode active material layer is supported on both surfaces of the positive electrode current collector 305a, the total thickness of the positive electrode active material layers 305b is preferably in the range of 20 μm to 300 μm. A more preferred range of the thickness for one surface is 30 μm to 120 μm. When the thickness is in this range, the large current discharge characteristics and the cycle life are enhanced.

The positive electrode active material layer 305b may also contain an electroconductive agent in addition to the positive electrode active material.

Furthermore, the positive electrode active material layer 305b may also contain a binder that binds the positive electrode materials.

Regarding the positive electrode active material, it is preferable to use various oxides, for example, manganese dioxide, lithium-manganese composite oxides, lithium-containing nickel-cobalt oxides (for example, $LiCoO_2$), lithium-containing nickel-cobalt oxides (for example, $LiNi_{0.8}Co_{0.2}O_2$), and lithium-manganese composite oxides (for example, $LiMn_2O_4$ and $LiMnO_2$), since high voltage can be obtained.

Examples of the electroconductive agent include acetylene black, carbon black, and graphite.

Specific examples of the binding material that can be used include, for example, polytetrafluoroethylene (PTFE), polyvinylidene fluoride (PVdF), an ethylene-propylene-diene copolymer (EPDM), and a styrene-butadiene rubber (SBR).

The mixing proportions of the positive electrode active material, the electroconductive agent and the binder are preferably adjusted in the ranges of from 80% by mass to 95% by mass of the positive electrode active material, from 3% by mass to 20% by mass of the electroconductive agent, and from 2% by mass to 7% by mass of the binder, from the viewpoint of obtaining satisfactory large current discharge characteristics and cycle life.

As the current collector 305a, an electroconductive substrate having a porous structure, or a poreless electroconductive substrate can be used. The thickness of the current collector is preferably from 5 μm to 20 μm. It is because when the thickness is in this range, a balance is achieved between electrode strength and weight reduction.

The positive electrode 305 is produced by, for example, suspending an active material, an electroconductive agent and a binder in a solvent that is generally used to prepare a slurry, applying this slurry on a current collector 305a, drying the slurry, and then pressing the current collector. The positive electrode 305 may also be produced by molding an active material, an electroconductive agent and a binder into a pellet form to be used as the positive electrode active material layer 305b, and forming this on the current collector 305a.

3) Negative Electrode 303

The negative electrode 303 has a structure in which a negative electrode active material layer 303b containing a negative electrode active material and other negative electrode materials is supported in a layer form on one surface or on both surfaces of a negative electrode current collector 303a. As for the negative electrode active material, the negative electrode active material 200 according to the second exemplary embodiment is used.

The thickness of the negative electrode active material layer 303b is preferably in the range of from 1.0 μm to 150 μm. Therefore, when the negative electrode active material layer is supported on both surfaces of the negative electrode current collector 303a, the total thickness of the negative electrode active material layers 303b is in the range of from 2.0 μm to 300 μm. A more preferred range of the thickness on one surface is from 20 μm to 100 μm. When the thickness is in this range, the large current discharge characteristics and the cycle life are enhanced to a large extent.

The negative electrode active material layer 303b may contain a binder that binds the negative electrode materials. Examples of the binder that can be used include polytetrafluoroethylene (PTFE), polyvinylidene fluoride (PVdF), an ethylene-propylene-diene copolymer (EPDM), a styrene-butadiene rubber (SBR), polyimide, polyaramid, polyacrylonitrile, and polyacrylic acid. Furthermore, two or more kinds of such binders may also be used in combination. When a combination of a binder which achieves excellent binding between active materials, and a binder which achieves excellent binding between the active material and the current collector, or a combination of a binder having high hardness and a binder having excellent flexibility is used, a negative electrode having excellent service life characteristics can be produced.

Furthermore, the negative electrode active material layer 303b may also contain an electroconductive agent. Examples of the electroconductive agent include acetylene black, carbon black, and graphite.

As the current collector 303a, an electroconductive substrate having a porous structure, or a poreless electroconductive substrate can be used. These electroconductive substrates can be formed from, for example, copper, stainless steel, or nickel. The thickness of the current collector 303a is preferably 5 μm to 20 μm. It is because when the thickness is in this range, a balance is achieved between electrode strength and weight reduction.

The negative electrode 303 is produced by, for example, suspending an active material, an electroconductive agent and a binder in a solvent that is generally used to prepare a slurry, applying this slurry on a current collector 303a, drying the slurry, and then pressing the current collector. The negative electrode 303 may also be produced by molding the active material 200, an electroconductive agent and a binder into a pellet form to be used as the negative electrode active material layer 303b, and forming this on the current collector 303a.

The mixing proportions of the negative electrode active material, the electroconductive agent and the binder are preferably adjusted in the ranges of from 80% by mass to 95% by mass of the negative electrode active material, from 3% by mass to 20% by mass of the electroconductive agent, and from 2% by mass to 7% by mass of the binder, from the viewpoint of obtaining satisfactory large current discharge characteristics and cycle life.

4) Electrolyte

As the electrolyte, a non-aqueous electrolyte solution, an electrolyte-impregnated polymer electrolyte, a polymer electrolyte, or an inorganic solid electrolyte can be used.

The non-aqueous electrolyte solution is a liquid-state electrolyte solution prepared by dissolving an electrolyte in a non-aqueous solvent, and is retained in the pores of the electrode group.

As the non-aqueous solvent, it is preferable to use a non-aqueous solvent containing, as a main component, a solvent mixture of propylene carbonate (PC) or ethylene carbonate (EC) and a non-aqueous solvent having a viscosity lower than that of PC or EC (hereinafter, referred to as second solvent).

The second solvent is preferably, for example, chain-like carbons, and among others, examples include dimethyl carbonate (DMC), methyl ethyl carbonate (MEC), diethyl carbonate (DEC), ethyl propionate, methyl propionate, γ-butyrolactone (BL), acetonitrile (AN), ethyl acetate (EA), toluene, xylene, and methyl acetate (MA). These second solvents can be used singly or as mixtures of two or more kinds. Particularly, it is more preferable that the second solvent have a donor number of 16.5 or less.

The viscosity of the second solvent is preferably 2.8 cmp or less at 25° C. The amount of incorporation of ethylene carbonate or propylene carbonate in the solvent mixture is preferably from 1.0% to 80% by volume. A more preferred amount of incorporation of ethylene carbonate or propylene carbonate is from 20% to 75% by volume.

Examples of the electrolyte that is included in the non-aqueous electrolyte solution include lithium salts (electrolytes) such as lithium perchlorate ($LiClO_4$), lithium phosphate hexafluoride ($LiPF_6$), lithium borofluoride ($LiBF_4$), lithium arsenic hexafluoride ($LiAsF_6$), lithium trifluorometa-sulfonate ($LiCF_3SO_3$), and lithium bis(trifluoromethylsulfonyl)imide [$LiN(CF_3SO_2)_2$]. Among them, it is preferable to use $LiPF_6$ or $LiBF_4$.

The amount of dissolution of the electrolyte in the non-aqueous solvent is preferably adjusted to from 0.5 mol/l to 2.0 mol/l.

5) Separator 304

In the case of using a non-aqueous electrolyte solution, and in the case of using an electrolyte-impregnated polymer electrolyte, a separator 304 can be used. As the separator 304, a porous separator is used. As the material of the separator 304, for example, porous films containing polyethylene, polypropylene, or polyvinylidene fluoride (PVdF), non-woven fabrics made of synthetic resins, and the like can be used. Among them, a porous film formed of polyethylene or polypropylene, or a porous film formed from both of them is preferred, because the safety of the secondary battery can be enhanced.

The thickness of the separator 304 is preferably adjusted to 30 µm or less. If the thickness exceeds 30 µm, the distance between the positive electrode and the negative electrode increases, and there is a risk that the internal resistance may increase. Also, it is preferable to set the lower limit of the thickness to 5 µm. If the thickness is set to less than 5 µm, the strength of the separator 304 markedly decreases, and there is a risk that an internal short circuit may easily occur. The upper limit of the thickness is more preferably set to 25 µm, and the lower limit is more preferably set to 1.0 µm.

The separator 304 is preferably such that the thermal shrinkage when aged for one hour under the conditions of 120° C. is 20% or less. If the thermal shrinkage exceeds 20%, there is an increasing possibility of short circuit caused by heating. It is more preferable to adjust the thermal shrinkage to 15% or less.

The separator 304 is preferably such that the porosity is adjusted in the range of from 30% to 70%. This is based on the following reason. If porosity is adjusted to less than 30%, there is a risk that it may be difficult to obtain high electrolyte retentivity in the separator 304. On the other hand, if porosity is greater than 60%, there is a risk that sufficient strength of the separator 304 may not be obtained. A more preferred range of porosity is 35% to 70%.

The separator 304 is preferably such that air permeability is 500 seconds/1.00 $cm^3$ or less. If air permeability exceeds 500 seconds/1.00 $cm^3$, there is a risk that it may be difficult to obtain high lithium ion mobility in the separator 304. Furthermore, the lower limit of air permeability is 30 seconds/1.00 $cm^3$. It is because if the air permeability is set to less than 30 seconds/1.00 $cm^3$, there is a risk that sufficient separator strength may not be obtained.

The upper limit of the air permeability is more preferably set to 300 seconds/1.00 $cm^3$, and the lower limit is more preferably set to 50 seconds/1.00 $cm^3$.

Fourth Exemplary Embodiment

Next, a battery pack according to a fourth exemplary embodiment will be described.

The battery pack according to the fourth exemplary embodiment includes one or more electric cells. When a plurality of electric cells are included in a battery pack, the respective electric cells are disposed to be electrically connected in series or parallel, or in series and parallel.

A battery pack 400 will be specifically described with reference to FIG. 7 and FIG. 8. In the battery pack 400 illustrated in FIG. 7, a battery corresponding to the non-aqueous electrolyte secondary battery 300 of the third exemplary embodiment is used as an electric cell 401.

A plurality of electric cells 401 constitute a battery assembly 405 by being laminated such that negative electrode terminals 402 and positive electrode terminals 403 that are extended out are aligned in the same direction, and bonded with an adhesive tape 404. These electric cells 401 are electrically connected to each other in series, as illustrated in FIG. 8.

A printed wiring board 406 is disposed to face the side surfaces of the electric cells 401 through which the negative electrode terminals 402 and the positive electrode terminals 403 are extended out. On the printed wiring board 406, a thermistor 407, a protective circuit 408, and a terminal 409 for electrical connection to an external device are mounted as illustrated in FIG. 8. Meanwhile, an insulating plate (not depicted in the diagram) is loaded on the surface of the printed wiring board 406 that faces the battery assembly 405, in order to avoid any unnecessary connection with the wiring of the battery assembly 405.

A lead 410 on the positive electrode side is connected to the positive electrode terminal 403 that is located in the lowermost layer of the battery assembly 405, and the tip of the lead is electrically connected by insertion to a connector 411 on the positive electrode side of the printed wiring board 406. A lead 412 on the negative electrode side is connected to the negative electrode terminal 402 that is located in the uppermost layer of the battery assembly 405, and the tip of the lead is electrically connected by insertion to a connector 413 on the negative electrode side of the printed wiring board 406. These connectors 411 and 413 are connected to the protective circuit 408 through wirings 414 and 415 that are formed on the printed wiring boards 406.

The thermistor 407 is used to detect the temperature of the electric cell 401, and the detection signal is transmitted to the protective circuit 408. The protective circuit 408 can block a positive side wiring 416a and a negative side wiring 416b between the protective circuit 408 and the terminal 409 for electrical connection to an external device, under predetermined conditions. The predetermined conditions mean conditions under which, for example, the detected temperature of the thermistor 407 reaches a temperature equal to or higher than a predetermined temperature. Furthermore, the predetermined conditions also include the cases where overcharge, overdischarge, overcurrent and the like of the electric cells 401 are detected. This detection of overcharge and the like is carried out for individual electric cells 401 or for the entirety of the electric cells 401. In the case of performing detection for individual electric cells 401, the battery voltage may be detected, or the positive electrode potential or the negative electrode potential may be detected. In the latter case, a lithium electrode that is used as a reference electrode is inserted between the individual electric cells 401. In the case of FIG. 7 and FIG. 8, wirings 417 for detecting the voltages of the respective electric cells 401 are connected, and detection signals are transmitted to the protection circuit 408 through these wirings 417.

At the three side faces of the battery assembly 405 excluding the side face where the positive electrode terminals 403 and the negative electrode terminals 402 are protruded, protective sheets 418 formed of rubber or a resin are respectively disposed.

The battery assembly 405 is accommodated in an accommodating container 419 together with the respective protective sheets 418 and the printed wiring board 406. That is, protective sheets 418 are respectively disposed at both the inner side faces in the longer edge direction and at an inner side face in the shorter edge direction of the accommodating container 419, and the printed wiring board 406 is disposed at the inner side face that is opposite to the shorter edge direction. The battery assembly 405 is located inside the space surrounded by the protective sheets 418 and the printed wiring board 406. A lid 420 is mounted on the top surface of the accommodating container 419.

Meanwhile, for the fixing of the battery assembly 405, a thermal shrinking tape may also be used instead of the adhesive tape 404. In this case, protective sheets are disposed on both the side faces of the battery assembly, a thermal shrinking tape is wound around the assembly, and then the thermal shrinking tape is caused to thermally shrink to thereby bind the battery assembly.

Figure 7:
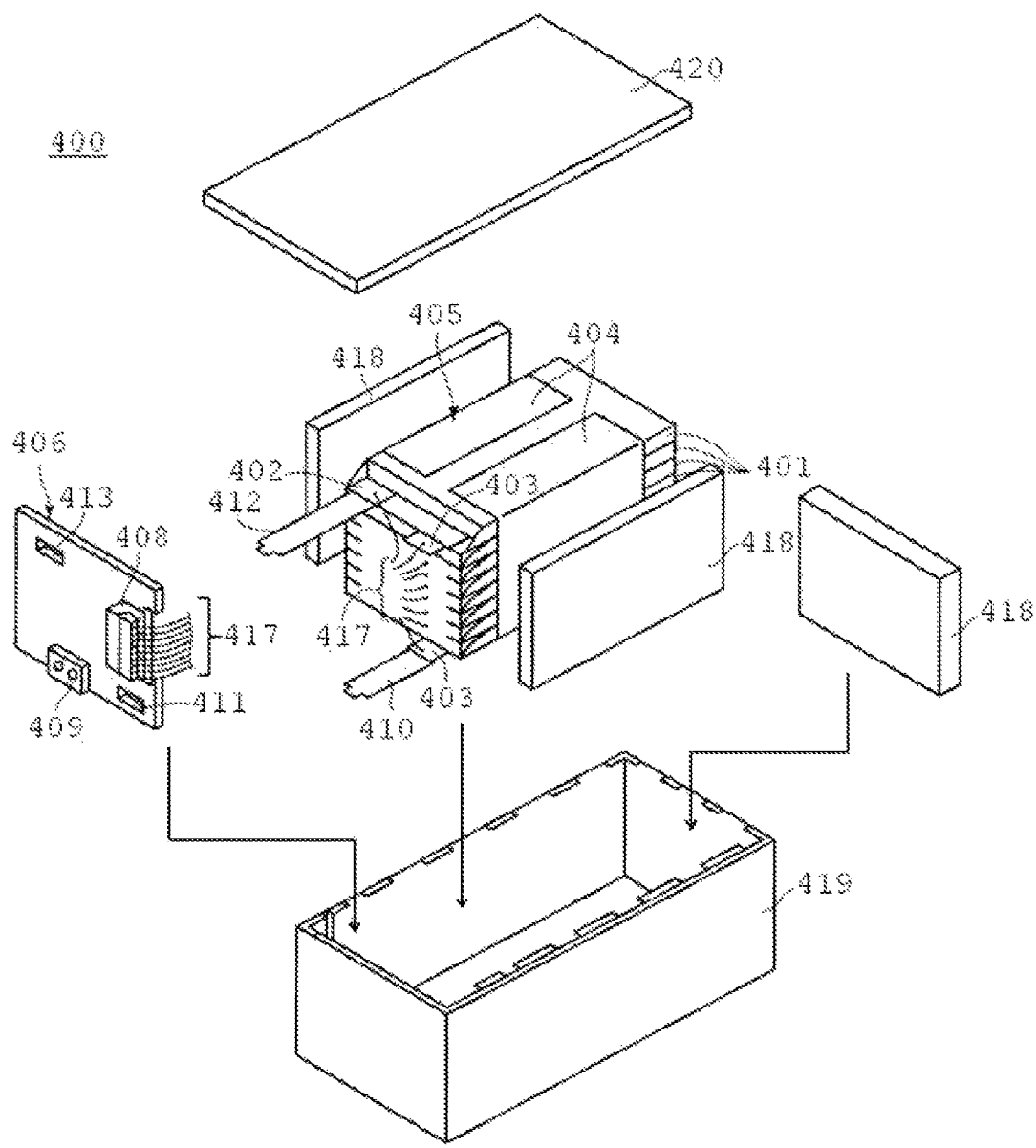
FIG. 7 is a conceptual diagram of an exemplary embodiment of the battery pack according to the present disclosure.
Figure 8:
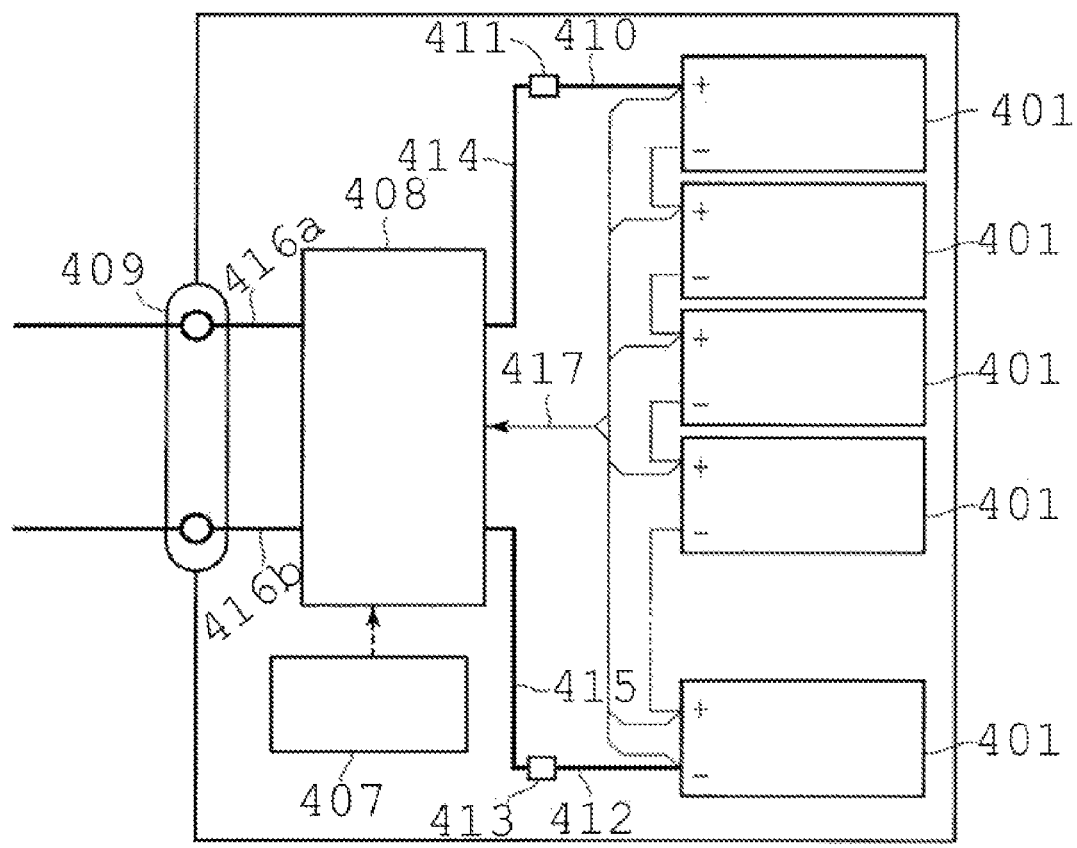
FIG. 8 is a block diagram of an exemplary embodiment of the battery pack according to the present disclosure.

FIG. 7 and FIG. 8 illustrate an embodiment in which electric cells 401 are connected in series, but in order to increase the battery capacity, the electric cells may be connected in parallel, or series connection and parallel connection may also be combined. Battery packs that have been constructed may also be connected in series or in parallel.

According to the present exemplary embodiment described above, a battery pack exhibiting excellent charge-discharge cycle performance can be provided by incorporating the non-aqueous electrolyte secondary battery according to the third exemplary embodiment that exhibits excellent charge-discharge cycle performance.

Meanwhile, the shape of the battery pack is appropriately varied depending on the use. It is preferable that the use of the battery pack be a use which exhibits the excellent cycle characteristics when a large electric current is extracted. Specific examples of the use include power supplies for digital cameras, and power supplies for vehicles such as two-wheeled to four-wheeled hybrid electric vehicles, two-wheeled to four-wheeled electric vehicles, and assist bicycles. In particular, a battery pack using a non-aqueous electrolyte secondary battery having excellent high temperature characteristics is suitably used for vehicles.

Hereinafter, specific Examples (examples of specifically fabricating the battery illustrated in FIG. 5 under the respective conditions described in the Examples) will be described, and their effects will be discussed.

Example 1

A mixed powder of silicon and silicon dioxide was plasma heated under the conditions described below, and thus a negative electrode material for non-aqueous electrolyte batteries was obtained.

As the silicon, a 3 N powder having a particle size of about 5 μm manufactured by Kojundo Chemical Lab Co., Ltd. was used. As the silicon dioxide, a 3 N powder having a particle size of about 4 μm manufactured by Kojundo Chemical Lab Co., Ltd. was used. The atomic molar ratios of oxygen/silicon and the specific surface areas of the raw material and the product are presented in Table 1. Meanwhile, the ratio of oxygen/silicon of the raw material was calculated from the mixing ratio of silicon and silicon dioxide, and the ratio of oxygen/silicon of the product was calculated by determining the amount of silicon by an acid decomposition-ICP emission spectroscopy method, and determining the amount of oxygen by an inert gas fusion-infrared absorption method, respectively. The latter is indicated in Table 1 as x of $SiO_x$. The specific surface area was obtained by the BET method. Crystalline silicon was confirmed by TEM observation, and for each of ten crystalline regions that have been randomly selected from an image obtained by the TEM observation, the average value of the directional diameters of the ten randomly selected regions was calculated. This was defined as the diameter of the crystalline silicon. Thereby, the proportion by number of crystalline silicon particles having a diameter of 100 nm or less among crystalline silicon particles having a diameter of 1 nm or greater, was obtained.

In the process of plasma heating, a region at a temperature of 8,000° C. was provided inside the apparatus, and a raw material powder was dropped from the top of the aforementioned region by means of a feeder, so as to allow the raw material powder to pass through the aforementioned region. The mixed powder that has been vaporized by heating passes through the region described above and then is rapidly cooled to be precipitated.

The negative electrode material for non-aqueous electrolyte batteries obtained by plasma heating, and a graphite powder having a particle size of 3 μm were compositized with hard carbon by a method such as described below. To a liquid mixture of 4 g of furfuryl alcohol, 9 g of ethanol and 0.2 g of water, 2 g of a powder of the negative electrode material for non-aqueous electrolyte batteries, 0.7 g of the graphite powder, and 0.06 g of a carbon fiber having an average diameter of 180 nm were added, and the mixture was kneaded with a kneader to form a slurry. To the slurry obtained after kneading, 0.2 g of dilute hydrochloric acid that serves as a polymerization catalyst for furfuryl alcohol was added, and the mixture was left to stand at room temperature, dried, and solidified. Thus, a carbon composite was obtained.

The carbon composite thus obtained was calcined at 1050° C. for 3 hours in an atmosphere of Ar gas, and the calcination product was cooled to room temperature. Subsequently, the calcination product was pulverized and classified through a sieve having a mesh size of 75 μm, and thus a negative electrode active material was obtained.

The active material obtained in Example 1 was subjected to a charge-discharge test that will be described below, and thus the charge-discharge characteristics were evaluated.

(Charge-Discharge Test)

The active material thus obtained was kneaded with 15% by mass of a graphite having an average diameter of 3 μm and 8% by mass of polyimide, by using N-methylpyrrolidone as a dispersion medium, and the kneading product was applied on a copper foil having a thickness of 12 μm. The copper foil was pressed, and then was heat-treated at 250° C. for 2 hours in an atmosphere of Ar gas. The copper foil was cut to a predetermined size, and then the copper foil was dried in a vacuum at 100° C. for 12 hours. The resultant was used as a testing electrode. A battery which used Li metal for an opposite electrode and a reference electrode, and an EC/DEC (volume ratio EC:DEC=1:2) solution of LiPF6 (1 M) as an electrolyte solution, was produced in an argon atmosphere, and a charge-discharge test was performed. Regarding the conditions for the charge-discharge test, charging was achieved at a current density of 1 $mA/cm^2$ such that the potential difference between the reference electrode and the test electrode would be 0.01 V, constant voltage charging was achieved at 0.01 V for 24 hours, and discharge was achieved at a current density of 1 $mA/cm^2$ to a voltage of 1.5 V. Furthermore, a cycle of charging at a current density of 1 $mA/cm^2$ to obtain a potential difference between the reference electrode and the test electrode would be 0.01 V, and discharging to 1.5 V at a current density of 1 mA/cm² was carried out 100 times, and the charge-discharge efficiency of the first cycle, and the discharge capacity after the 100th cycle were measured.

TABLE 1

|  | Raw material Oxygen/silicon (atomic molar ratio) | Product | | | Battery characteristics | |
| --- | --- | --- | --- | --- | --- | --- |
|  |  | x of $SiO_x$ | BET [m²/g] | Proportion | first time [%] | 100th cycle [mAh/g] |
| Example 1 | 0.50 | 0.64 | 169 | 100 | 76 | 940 |
| Example 2 | 0.56 | 0.78 | 182 | 100 | 75 | 858 |
| Example 3 | 0.29 | 0.35 | 136 | 100 | 80 | 1030 |
| Comparative Example1 | — | 1.00 | 32 | 100 | 65 | 776 |
| Comparative Example2 | 0.67 | 1.20 | 174 | 100 | 64 | 728 |
| Comparative Example3 | 0.14 | 0.29 | 102 | 70 | 84 | 780 |

BET: BET specific surface area [m²/g].
Proportion: Proportion by number [%] of crystalline silicon having particle size of 100 nm or less among particles having size of 1 nm or greater.
first time: Charge-discharge efficiency of first time [%].
100th cycle: Charge-discharge capacity of 100th cycle [mAh/g]

The results of the following Examples and Comparative Examples are also summarized in the above Table 1. In the following Examples and Comparative Examples, only the parts that are different from Example 1 will be described, and since the other parts of the procedures of synthesis and evaluation were carried out in the same manner as in Example 1, further descriptions will not be repeated.

Examples 2 and 3

The ratio of oxygen/silicon of the mixed powder of silicon and silicon dioxide was changed as indicated in Table 1, and plasma heating was conducted. As a result, the ratio of oxygen/silicon and the specific surface area of the product negative electrode materials for non-aqueous electrolyte batteries were obtained as indicated in Table 1.

Comparative Example 1

Pulverization of silicon monoxide was carried out under the conditions described below, and thus a negative electrode material for non-aqueous electrolyte batteries was obtained. A silicon monoxide powder (manufactured by Sigma-Aldrich Company, 325 mesh under) as a raw material was subjected to a pulverization treatment for a predetermined time in a continuous type bead mill apparatus, by using beads having a bead size of 0.5 μm and ethanol as a dispersion medium. This silicon monoxide powder was further subjected to pulverization in a planetary ball mill by using 0.1-μm balls and ethanol as a dispersion medium, and thus a finely pulverized powder of silicon monoxide was produced.

The silicon monoxide powder obtained by the fine pulverization treatment, and a graphite powder having a particle size of 3 μm were compositized with hard carbon by a method such as described below. To a liquid mixture of 4 g of furfuryl alcohol, 2 g of ethanol and 0.2 g of water, 2 g of the negative electrode material powder for non-aqueous electrolyte batteries, 0.7 g of the graphite powder, and 0.06 g of a carbon fiber having an average diameter of 180 nm were added, and the mixture was kneaded with a kneader to form a slurry. The amount of ethanol was reduced as compared with Example 1, because when a liquid mixture such as described above and solids are kneaded to form a slurry, a liquid having a very low viscosity is obtained. In this case, there is a risk that uneven distribution of solids may occur depending on the density and size of the solids during the kneading treatment. One of the reasons why the slurry state is significantly different from the slurry state of Examples as such, may be that the particle size of the silicon oxide is larger. To the slurry obtained after kneading, 0.2 g of dilute hydrochloric acid that serves as a polymerization catalyst for furfuryl alcohol was added, and the mixture was left to stand at room temperature, dried, and solidified. Thus, a carbon composite was obtained.

The carbon composite thus obtained was calcined at 1050° C. for 3 hours in an atmosphere of Ar gas, and the calcination product was cooled to room temperature. Subsequently, the calcination product was pulverized and classified through a sieve having a mesh size of 75 μm, and thus a negative electrode active material was obtained.

Comparative Example 2

The ratio of oxygen/silicon of the silicon and diacid raw material was changed as indicated in Table 1, and plasma heating was carried out. As a result, the ratio of oxygen/silicon and the specific surface area of the product negative electrode material for non-aqueous electrolyte batteries were obtained as indicated in Table 1.

Comparative Example 3

The ratio of oxygen/silicon of the silicon and diacid raw material was changed as indicated in Table 1, and plasma heating was carried out. As a result, the ratio of oxygen/silicon and the specific surface area of the product negative electrode material for non-aqueous electrolyte batteries were obtained as indicated in Table 1.

The negative electrode materials obtained in Examples 1, 2 and 3, and Comparative Example 2, and the negative electrode active material obtained in Comparative Example 1 were subjected to a powder X-ray diffraction analysis, and the constituent phases were identified. Only for Comparative Example 1, the negative electrode active material was analyzed instead of the negative electrode material, because the silicon formed as a result of heating and disproportionation of the silicon monoxide used as the negative electrode material of Comparative Example 1, was the negative electrode active material of Comparative Example 1. The analysis was carried out by using an X-ray diffraction analyzer (Model RINT-1200) manufactured by Rigaku Corp., under the following conditions:

Counter negative electrode: Cu
Tube voltage: 40 kV
Tube current: 40 mA
Scanning speed: 4° (2θ)/min
Receiving slit: 0.30 mm
Divergence slit: 1°
Scattering slit: 1°

FIG. 2 illustrates the diffraction pattern of Example 1. The peaks of the diffraction pattern significantly coincided with the peaks of Si of the JCPDS Card No. 27-1402. Also for the negative electrode materials obtained in Examples 2 and 3 and Comparative Example 2, the same results were obtained, and thus, it was understood that these negative electrode materials exhibit diffraction peaks of crystalline silicon. In regard to the negative electrode active material obtained in Comparative Example 1, the peaks of the diffraction pattern overlapped with peaks of carbon (C) and the like, and not all the peaks were clearly verified; however, peaks of Si (111) were identified.

Figure 9:
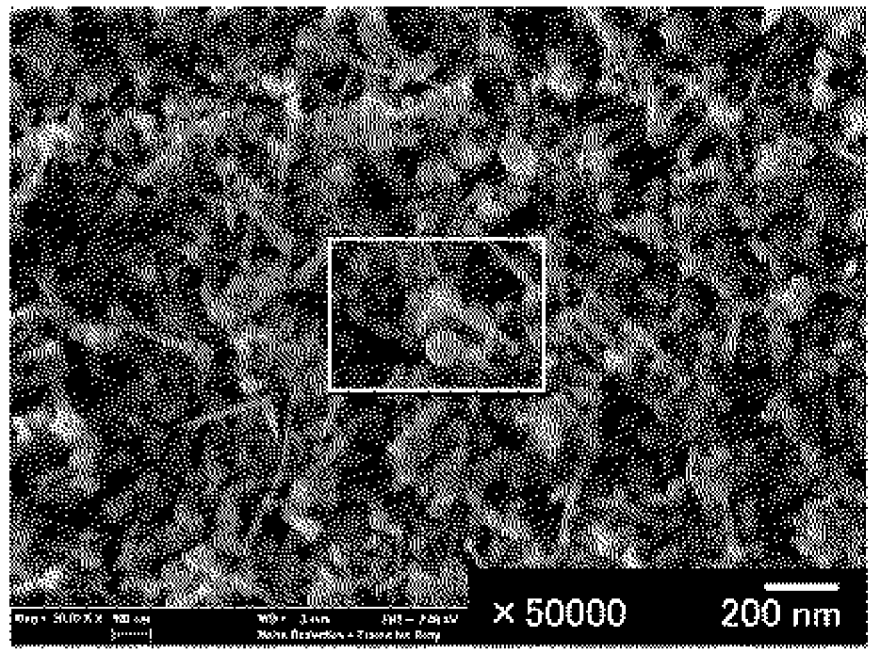
FIG. 9 is a scanning electron microscopic (SEM) image of the negative electrode material of Example 1.
Figure 10:
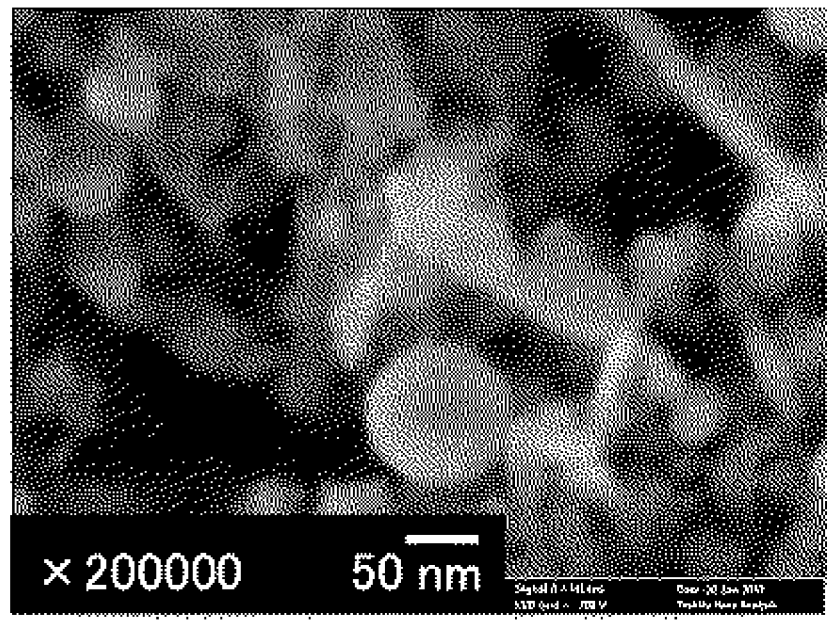
FIG. 10 is a magnified SEM image of the negative electrode material of Example 1.
Figure 11:
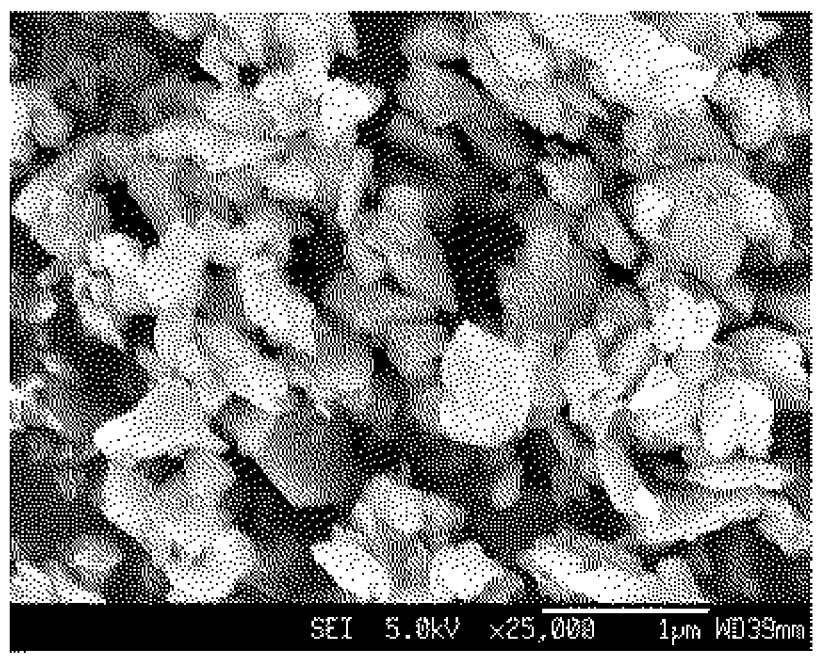
FIG. 11 is a SEM image of the negative electrode material of Comparative Example 1.

FIG. 9 and FIG. 10 illustrate SEM images of Example 1. FIG. 10 is a magnified diagram of the region surrounded by a square in FIG. 9. The negative electrode materials obtained in Examples 1, 2 and 3 all had the same fine structure as that illustrated in FIG. 9 and FIG. 10. From FIG. 9, it was found that the negative electrode material contained a porous structure formed from nanoparticles having a particle size of 100 nm or less, and even particles having a particle size of smaller than 50 nm were also observed. Furthermore, in Examples 1 and 2, a large number of fibrous materials having a thickness of about 20 nm and a length of about several hundred nanometers were observed. Particularly, there was a plural number of the fibrous material that was longer than the average particle size of the nanoparticles having a particle size of 100 nm or less. Meanwhile, in Example 3, no fibrous material was identified. FIG. 11 presents the results obtained by observing by SEM the silicon monoxide powder obtained by a fine pulverization treatment, which is the negative electrode material obtainable by an intermediate process of Comparative Example 1. It was found that the particle shape is greatly different from the particle shape found in FIG. 9. Particles having an average size of about 400 nm are aggregated, and do not form a porous body. Furthermore, a fibrous material which was longer than the average particle size of the particles having a particle size of about 400 nm was not observed.

Figure 12:
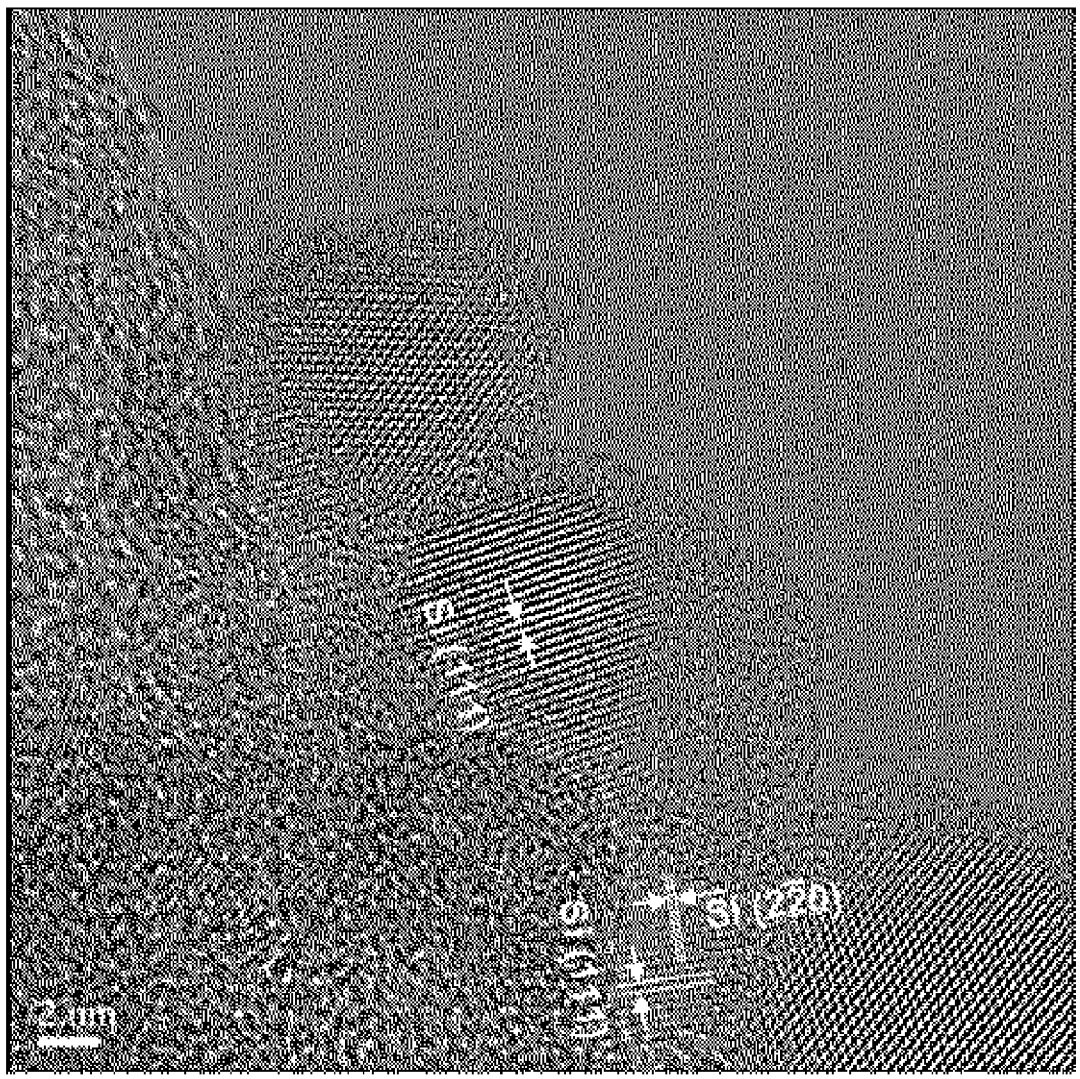
FIG. 12 is a transmission electron microscopic (TEM) image of the negative electrode material of Example 1.

FIG. 12 illustrates a TEM image of Example 1. The negative electrode materials obtained in Examples 1, 2 and 3 all contained a crystal structure such as illustrated in FIG. 12. In FIG. 12, it was observed that crystalline silicon having a particle size of about from 4 nm to 12 nm was present, and the periphery of the crystalline silicon was covered with an amorphous material.

Therefore, as is obvious from the results indicated in Table 1 and the observation results described above, it is understood that in a negative electrode for non-aqueous electrolyte batteries including a negative electrode active material for non-aqueous electrolyte batteries that is prepared by using a negative electrode material for non-aqueous electrolyte batteries, which is a silicon oxide represented by the composition formula, $SiO_x$, with $0.1 \leq x \leq 0.8$, contains crystalline silicon, has 90% by number or more of particles having a diameter of 100 nm or less among the particles of crystalline silicon having a diameter of 1 nm or greater, and has a BET specific surface area of larger than 100 m$^2$/g, the charge-discharge efficiency of the first cycle and the discharge capacity of the 100$^{th}$ cycle are both excellent.

On the contrary, as in the case of Comparative Example 1, a negative electrode material for non-aqueous electrolyte batteries produced by using a commercially available silicon monoxide, does not contain a porous structure that is formed from nanoparticles having a particle size of 100 nm or less, has a BET specific surface area of 32 m$^2$/g, which was less than 100 m$^2$/g. Furthermore, even in the case of a negative electrode material for non-aqueous electrode batteries produced by plasma heating such as in Examples 1 to 3, a negative electrode for non-aqueous electrolyte batteries including a negative electrode active material for non-aqueous electrolyte batteries that is prepared by using the negative electrode material for non-aqueous electrolyte batteries of Comparative Example 2, which has the composition formula, $SiO_x$, with $0.8<x$, was such that the charge-discharge efficiency of the first cycle and the discharge capacity of the 100th cycle were both lower as compared with Examples 1 to 3. Furthermore, a negative electrode for non-aqueous electrolyte batteries including a negative electrode active material for non-aqueous electrolyte batteries that is prepared by using the negative electrode material for non-aqueous electrolyte batteries of Comparative Example 3, which has less than 90% by number of particles having a diameter of 100 nm or less among the particles of crystalline silicon having a diameter of 1 nm or greater, was such that the discharge capacity of the 100th cycle was lower as compared with Examples 1 to 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode material for non-aqueous electrolyte secondary batteries, comprising a silicon oxide represented by the composition formula, $SiO_x$ that includes crystalline silicon and silicon oxide,
   wherein x satisfies the relation of $0.1 \leq x \leq 0.8$;
   the silicon oxide includes the crystalline silicon;
   wherein the crystalline silicon has a first number of particles having a diameter of 1 nm or greater, the crystalline silicon has a second number of particles having a diameter of 1 nm or greater and 100 nm or less, and the second number is 90% or more of the first number or;
   the BET specific surface area of the silicon oxide is larger than 100 m$^2$/g;
   and where:
   d16% is a diameter of 16% cumulative volume fraction of the silicon oxide and d84% is a diameter of 84% cumulative volume fraction of the silicon oxide in the form of particles; and
   a deviation in diameter of particles expressed as (d84%−d16%)/(2*average size of the silicon oxide particles), is 1.0 or less.

2. The material according to claim 1, wherein the silicon oxide includes amorphous silicon oxide.

3. The material according to claim 1, wherein a powder of the silicon oxide forms secondary particles, in which primary particles including the crystalline silicon are aggregated, a porous material including the crystalline silicon, or a mixture of the secondary particles and the porous material.

4. The material according to claim 3, wherein the primary particles include particles having a diameter of 120 nm or less.

5. The material according to claim 3, wherein the porous material includes fine pores having a pore size of 120 nm or less.

6. The material according to claim 1, wherein the x satisfies the relation of $0.1 \leq x \leq 0.7$.

7. The material according to claim 1, wherein the x satisfies the relation of $0.1 \leq x \leq 0.5$.

8. The material according to claim 1, further comprising a fibrous material including the crystalline silicon or the silicon oxide, which has a thickness of from 5 nm to 30 nm and a length of 100 nm or greater.

9. The material according to claim 1, wherein the crystalline silicon in the form in which a portion of the crystalline silicon is not covered with the silicon oxide, is included in the negative electrode material at a proportion by number of 10% of grains or less.

* * * * *